United States Patent [19]
Hayes et al.

[11] Patent Number: 5,889,384
[45] Date of Patent: Mar. 30, 1999

[54] POWER TRANSFER AND VOLTAGE LEVEL CONVERSION FOR A BATTERY-POWERED ELECTRONIC DEVICE

[75] Inventors: John J. Hayes, Wake Forest; David R. Irvin, Raleigh, both of N.C.

[73] Assignee: Ericsson Inc., Research Triangle Park, N.C.

[21] Appl. No.: 803,250

[22] Filed: Feb. 20, 1997

[51] Int. Cl.$^6$ ....................................................... H02J 7/00
[52] U.S. Cl. ..................... 320/108; 307/66; 320/DIG. 28
[58] Field of Search ........................... 320/108, DIG. 28, 320/DIG. 29; 307/66

[56] References Cited

U.S. PATENT DOCUMENTS

| | | | |
|---|---|---|---|
| 4,506,766 | 3/1985 | Watanabe | 307/66 |
| 4,672,520 | 6/1987 | Ueda et al. | 307/66 |
| 4,985,819 | 1/1991 | Mori et al. | 307/66 |
| 5,122,729 | 6/1992 | Itoga et al. | . |
| 5,140,509 | 8/1992 | Murugan | 363/17 |
| 5,157,319 | 10/1992 | Klontz et al. | . |
| 5,264,776 | 11/1993 | Hulsey | . |
| 5,327,065 | 7/1994 | Bruni et al. | . |
| 5,341,083 | 8/1994 | Klontz et al. | . |
| 5,455,466 | 10/1995 | Parks et al. | 307/104 |
| 5,536,979 | 7/1996 | McEachern et al. | . |

FOREIGN PATENT DOCUMENTS 0 533 247 A1  3/1993  European Pat. Off. .

*Primary Examiner*—Peter S. Wong
*Assistant Examiner*—K. Shin
*Attorney, Agent, or Firm*—Burns, Doane, Swecker & Mathis, L.L.P.

[57] ABSTRACT

A power supply device and system for providing power to a portable electronic device. A detachable device includes a rechargeable DC power source, a DC-to-AC inverter, and a primary transformer winding around a first core element. The portable electronic device includes multiple secondary transformer windings around a second core element. The detachable device cooperates with the portable electronic device so as to form a complete power supply circuit for providing AC and/or DC operating voltages to the portable electronic device.

21 Claims, 3 Drawing Sheets

POWER TRANSFER AND VOLTAGE LEVEL CONVERSION FOR A BATTERY-POWERED ELECTRONIC DEVICE

FIELD OF THE INVENTION

The present invention relates generally to power supply devices. More particularly, the present invention relates to rechargeable power supply devices for providing power to a portable electronic device such as a mobile telephone.

BACKGROUND OF THE INVENTION

In the rapidly-developing field of wireless communication devices, and in portable electronic devices in general, power supply systems which provide a safe, reliable, long-lasting source of power without compromising the portability of the device are highly desirable. The power supply requirements of many electronic devices are evolving as new generations of integrated circuits are developed which operate at decreasing voltage levels. These decreasing voltage requirements allow battery assemblies for portable electronic devices to be made smaller and lighter. However, the reduction in operating voltages for some chips results in different operating voltage levels for different portions of the electronic device. Further contributing to this problem of multiple supply voltage levels is the fact that analog circuits perform better at voltage levels which are higher than the voltage levels required by many digital integrated circuits. Finally, some circuit components, such as RF power amplifiers and displays, require negative supply voltages. Generating all of the necessary supply voltages for a particular electronic device can consume a significant amount of surface area on a printed circuit board, and is typically inefficient.

An additional problem results from the evolving power supply requirements of mobile telephones and other portable electronic devices, in that devices which require relatively high supply voltage levels experience a relatively insignificant power loss across the contacts which connect the power supply to the device. However, as the voltage supply requirements decrease, the current across the power supply contacts increases, and the voltage drop and power loss across the power supply contacts becomes significant.

Known power supply systems for portable electronic devices use conventional power supply contacts to supply power from a battery assembly to the device. In some cases, multiple power supply contacts are used to decrease the total resistance at the contacts. Different voltage levels can be derived using linear regulators and boost or buck voltage converters. However, known power supply systems do not adequately address the problem of power loss across the power supply contacts. Further, known power supply systems do not adequately address the problems of inefficient use of PC board area, which occurs as a result of multiple linear voltage regulators or boost/buck voltage converters.

One example of a known power supply system is disclosed in U.S. Pat. No. 5,327,065 to Bruni et al. (Bruni). Bruni discloses a hand-held inductive charger having concentric windings for transferring power across a dielectric medium using magnetic induction. More particularly, the charger includes a primary coil and is connected to an electrical power source via a cable. The charger is designed to be inserted into a receptacle housing having a secondary coil coupled to an automobile battery. When the charger is inserted into the receptacle housing, the primary and secondary coils form a transformer which transfers power from the electrical power source to the automobile battery to charge the battery. Since the Bruni device relates to the charging of electric automobile batteries, it is not designed for portability. Further, the Bruni device is designed to transfer approximately 6000 watts, and therefore is not applicable to typical portable electronic devices. Further, Bruni does not adequately address the problem of power loss occurring at the power supply contacts due to the relatively low voltages required by the powered device, and does not address the problem of providing multiple supply voltages.

Another example of a known power supply system is disclosed in U.S. Pat. Nos. 5,157,319 and 5,341,083 to Klontz et al. (Klontz). Klontz discloses a contactless battery charging system for recharging an electric automobile battery. In the Klontz system, a primary converter converts power from a power source into high frequency power, and a secondary converter in the automobile is coupled to the battery. When the primary and secondary converters are coupled together by a contactless coupling to form a transformer, power is transferred from the power source to the battery for charging. As described above with respect to Bruni, Klontz does not address the problem of providing multiple supply voltages to a portable electronic device, or the problem of power consumption across the power supply contacts in a relatively low-voltage portable electronic device.

U.S. Pat. No. 5,264,776 to Hulsey (Hulsey) discloses an inductive coupling charge port for charging an electric vehicle. The Hulsey system includes a hand-held primary coil assembly connected to a power source, and a secondary coil assembly disposed in a cavity in the vehicle. The secondary coil assembly is connected to the vehicle battery, and includes a first portion of a transformer core. A hinged access door provides access to the cavity, and has a second portion of the transformer core attached by a compressible material to the inner surface of the hinged access door. When the primary coil assembly is inserted into the cavity and the hinged access door is closed, a complete transformer core is formed, and power is transferred from the power source to the battery. As with the Bruni and Klontz systems, the Hulsey system is not directed to providing multiple voltages to a portable electronic device.

Therefore, it would be desirable for a power supply system for a portable electronic device to provide a reliable, safe, relatively long-life power supply to the portable electronic device, including multiple supply voltages, in an efficient manner so as to enhance the portability of the electronic device.

SUMMARY OF THE INVENTION

The present invention overcomes the above-described problems, and provides additional advantages, by providing for a power supply device and system which provides multiple supply voltages to a portable electronic device. According to exemplary embodiments, the system includes a detachable device having a rechargeable DC power source, a DC-to-AC inverter, and a primary transformer winding around a first core element. The electronic device has multiple secondary transformer windings around one or more second core elements. The detachable device cooperates with the electronic device such that the primary and secondary transformer windings form a complete magnetic circuit, which acts as a transformer core to allow the transmission of power from the detachable device to the electronic device. The electronic device further includes rectifiers and voltage regulators to provide a plurality of DC and/or AC voltages. The system can be further enhanced by providing the detachable device with a rectifier and the electronic device with means for coupling an external power source to the secondary windings. In this manner, the rechargeable power source can be recharged if the detachable device is connected to the electronic device and if the electronic device is receiving power from an external power supply.

The device and system of the present invention thus overcomes the deficiencies of the prior art by providing a reliable, long-life power supply for a portable electronic device requiring multiple supply voltages while enhancing the portability of the device.

BRIEF DESCRIPTION OF THE DRAWINGS

A more complete understanding of the present invention can be obtained upon reading the following Detailed Description of the Preferred Embodiments, in conjunction with the accompanying drawings, in which like reference indicia are used to designate like elements, and in which.

DETAILED DESCRIPTION OF THE PREFERRED EMBODIMENTS

Figure 1:
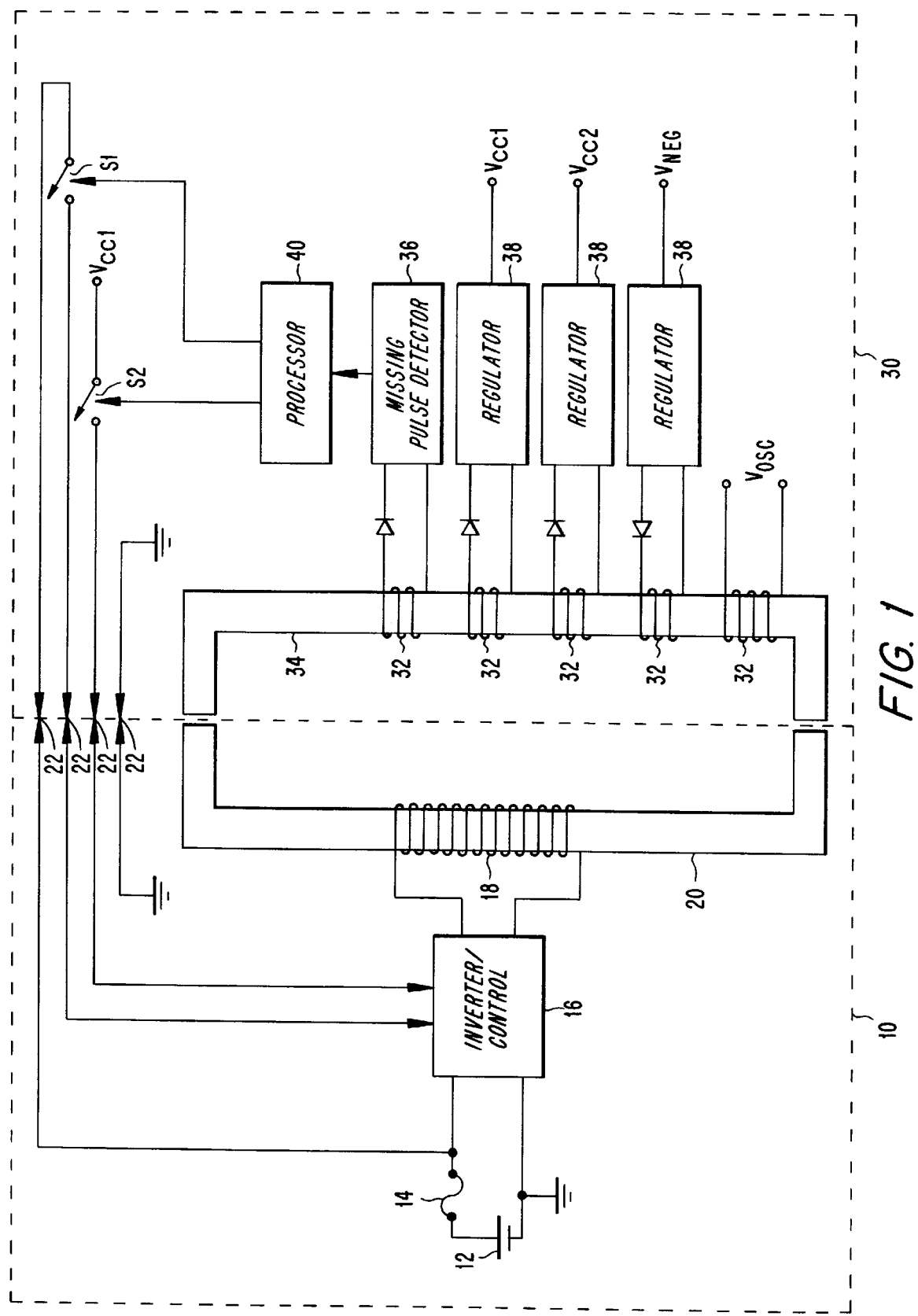
FIG. 1 is block diagram showing a battery assembly and portable electronic device in cooperation according to the principles of the present invention.

FIG. 1 shows a battery assembly and portable electronic device in cooperation according to the principles of the present invention. The battery assembly 10 includes a rechargeable power supply 12, a fuse 14, and inverter/control circuit 16, and a first transformer portion comprising a primary winding 18 and a first core element 20. The battery assembly 10 further includes one or more suitable contacts 22 which receive control signals from the portable electronic device 30 when the battery assembly 10 cooperates with the electronic device 30. The control signals control the on/off state of the battery and battery charging, as will be described in more detail below. The rechargeable power supply 12 can include one or more rechargeable direct current (DC) battery cells for providing a DC voltage. Fuse 14 can be any suitable safety means for providing over-current protection. Inverter/control circuit 16 converts the DC voltage provided by the rechargeable power supply into an alternating current (AC) voltage.

The portable electronic device 30 includes a second transformer portion including one or more secondary windings 32 and a second core element 34. The electronic device 30 can further include a missing pulse detector 36, regulators 38, power switches S1 and S2, and a microprocessor 40. The portable electronic device 30 also includes suitable contacts which cooperate with the contacts 22 of the battery assembly 10 to provide the appropriate control signals. According to a preferred embodiment of the present invention, a secondary winding is provided for each supply voltage level required by the portable electronic device 30. For purposes of illustration, the device of FIG. 1 includes secondary windings which provide two positive voltage levels $V_{cc1}$, $V_{cc2}$, one negative voltage level $V_{neg}$, and one varying (not rectified) voltage $V_{osc}$.

When the battery assembly 10 and portable electronic device 30 are brought into cooperation, the first and second transformer portions are aligned to form a complete transformer (i.e., providing a magnetic connection), and the contacts of the portable electronic device 30 and the contacts 22 of the battery assembly are aligned so as to electrically connect the device and the battery assembly. Preferably, the first and second core elements 20 and 34 of the complete transformer are iron core elements, or other elements suitable for providing an efficient flux path. Assuming that the first and second core elements are iron, the battery assembly 10 and portable electronic device 30 are preferably constructed such that they mechanically mate to place the first and second transformer portions in physical contact with each other, without significant air gaps.

When the battery assembly 10 and portable electronic device 30 are in cooperation, the device operates as follows. A device user can operate switch S1 (e.g., a pushbutton switch) to cause switch S1 to close. When switch S1 is closed, battery voltage is supplied from the power source 12 to the inverter/control circuit 16 via closed switch S1 and contacts 22, thus switching on inverter/control circuit 16. When turned on, inverter/control circuit 16 converts the DC voltage provided by power source 12 into an AC voltage, and provides the AC voltage to the primary winding 18.

As a result of the complete magnetic circuit formed by the first and second transformer portions, the AC voltage applied to the primary winding 18 induces an AC voltage in the secondary windings 32, thus providing power to the circuits of the portable electronic device 30, including regulators 38 and microprocessor 40. Once the circuits of the device 30 are operational, the regulators 38 output various voltages, including an operating voltage $V_{cc1}$. When this operational state is achieved, microprocessor 40 closes switch S2. The closing of switch S2 provides a DC voltage (from $V_{cc1}$) to inverter 16 via contacts 22, thereby maintaining the inverter 16 in an active operational state and enabling the battery assembly 10 to provide power to the electronic device 30.

During operation of the portable electronic device 30, information is conveyed from the battery assembly 10 by periodically omitting a portion (e.g., one cycle or one half-cycle) of the varying current waveform applied to the primary winding 18. The time between the missing cycles conveys the information. The missing pulse detector 36 operates in conjunction with the microprocessor 40 to detect the conveyed information and respond accordingly. The conveyed information can include the battery type (used in power source 12), remaining battery capacity, operating time since the last full charge of power source 12, as well as other useful data concerning the state of the battery assembly 10.

The missing pulse detector can also convey information concerning the state of switch S1. This facilitates turning the phone off by the user, as follows: While the phone is on, the user can operate switch S1 to turn the phone off. The closure of switch S1 is sensed by the inverter/control circuit 16. The inverter/control circuit 16 conveys the change of state of switch S1 by omitting pulses in the waveform applied to the primary winding 18 in an appropriate pattern. The pattern of missing pulses is conveyed to the processor 40 via the missing pulse detector 36. Upon receiving this information, the processor 40 outputs a signal to switch S2, causing switch S2 to open. In this state, both control signals to the inverter/control circuit 16 are low, causing it to cease applying a waveform to the primary winding 18.

Figure 2:
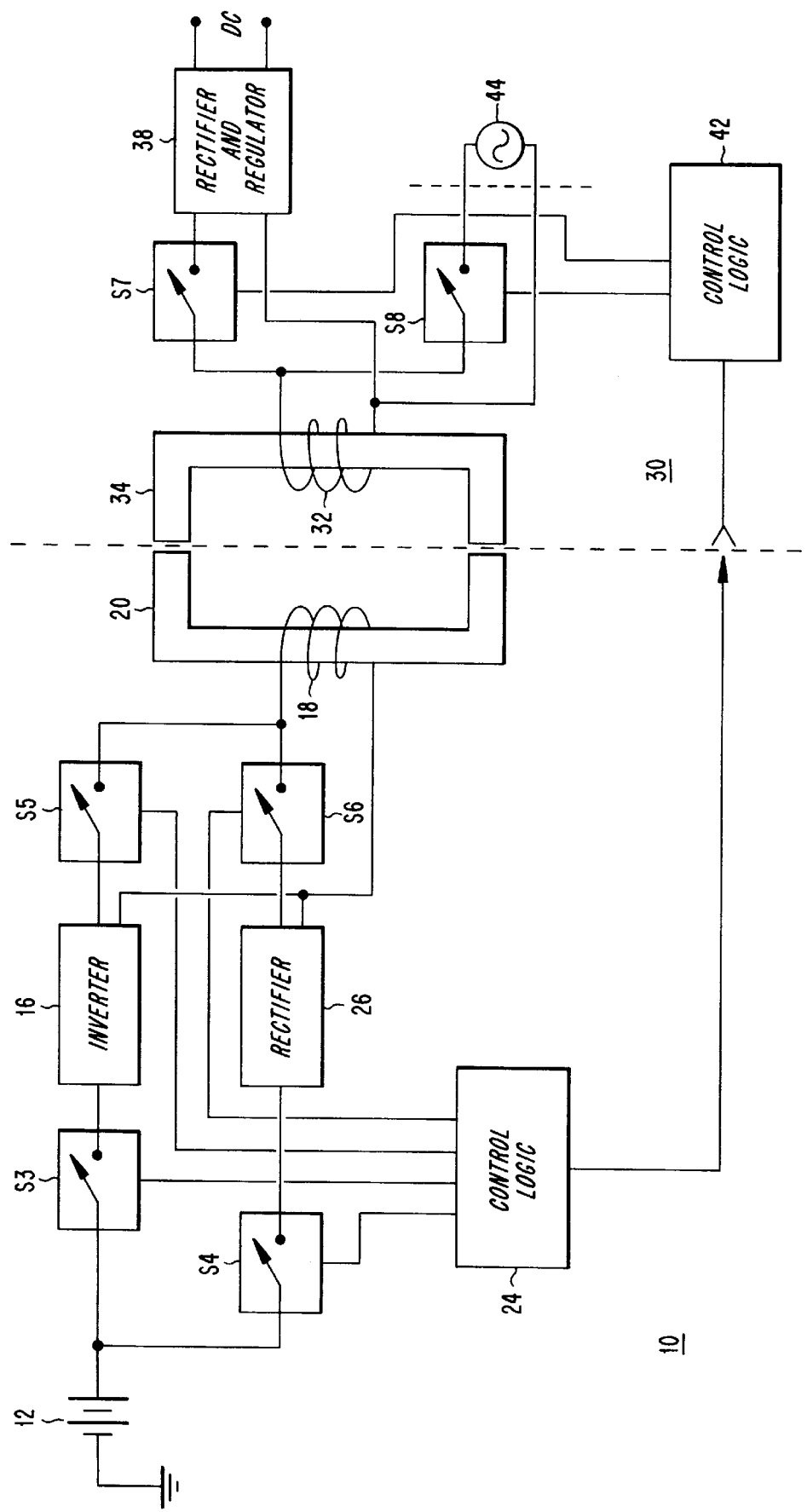
FIG. 2 is a block diagram of a first alternative embodiment of the battery assembly and portable electronic device of FIG. 1.

FIG. 2 shows a block diagram of a first alternative embodiment of the battery assembly and portable electronic device of FIG. 1. In the embodiment of FIG. 2, which includes only the modified portions of the system of FIG. 1, the battery assembly 10 is provided with a control logic 24, a rectifier 26, and control switches S3–S6. Further, the portable electronic device 30 is provided with a control logic 42 and control switches S7 and S8. Further, in this embodiment, battery assembly 10 cooperates with portable electronic device 30 while the device 30 is connected to an external AC power source 44. In this arrangement, the external AC power provided by power source 44 can be used to recharge the rechargeable power source 12 of the battery assembly 10. In a first mode of operation, the battery assembly 10 powers the portable electronic device 30 when control logic elements 24 and 42 cause switches S3, S5, and S7 to be closed and switches S4, S6, and S8 to be opened. In this mode of operation, a DC voltage is supplied by source 12 to inverter 16 via closed switch S3, and inverter 16 converts the DC voltage to an AC voltage for application to primary winding 18 via closed switch S5. The complete transformer formed by primary coil 18, first core element 20, second core element 34, and secondary winding 32 (only one is shown for purposes of explanation) provides an AC voltage to rectifier/regulator 38 via closed switch S7, and a DC voltage is provided to the portable electronic device 30 by rectifier/regulator 38.

In a second mode of operation, the portable electronic device 30 is connected to receive AC power from external AC power source 44 while the device 30 is also connected to battery assembly 10. In this mode of operation, control logic elements 24 and 42 cause switches S4, S6, and S8 to close, and switches S3, S5, and S7 to open, such that AC power is supplied from external AC power source 44 to secondary winding 32. The transformer then supplies a corresponding AC voltage to rectifier 26 via closed switch S6. Rectifier 26 rectifies the AC voltage and provides a DC voltage to rechargeable power source 12 via closed switch S4. In this manner, the embodiment of FIG. 2 includes means for supplying an external AC power source to the second portion of the transformer and a rectifying means in the battery assembly 10 for rectifying an AC voltage, such that the rechargeable power source 10 is recharged when the battery assembly 10 and portable electronic device 30 are connected while the device 30 receives external AC power from an external source.

Figure 3:
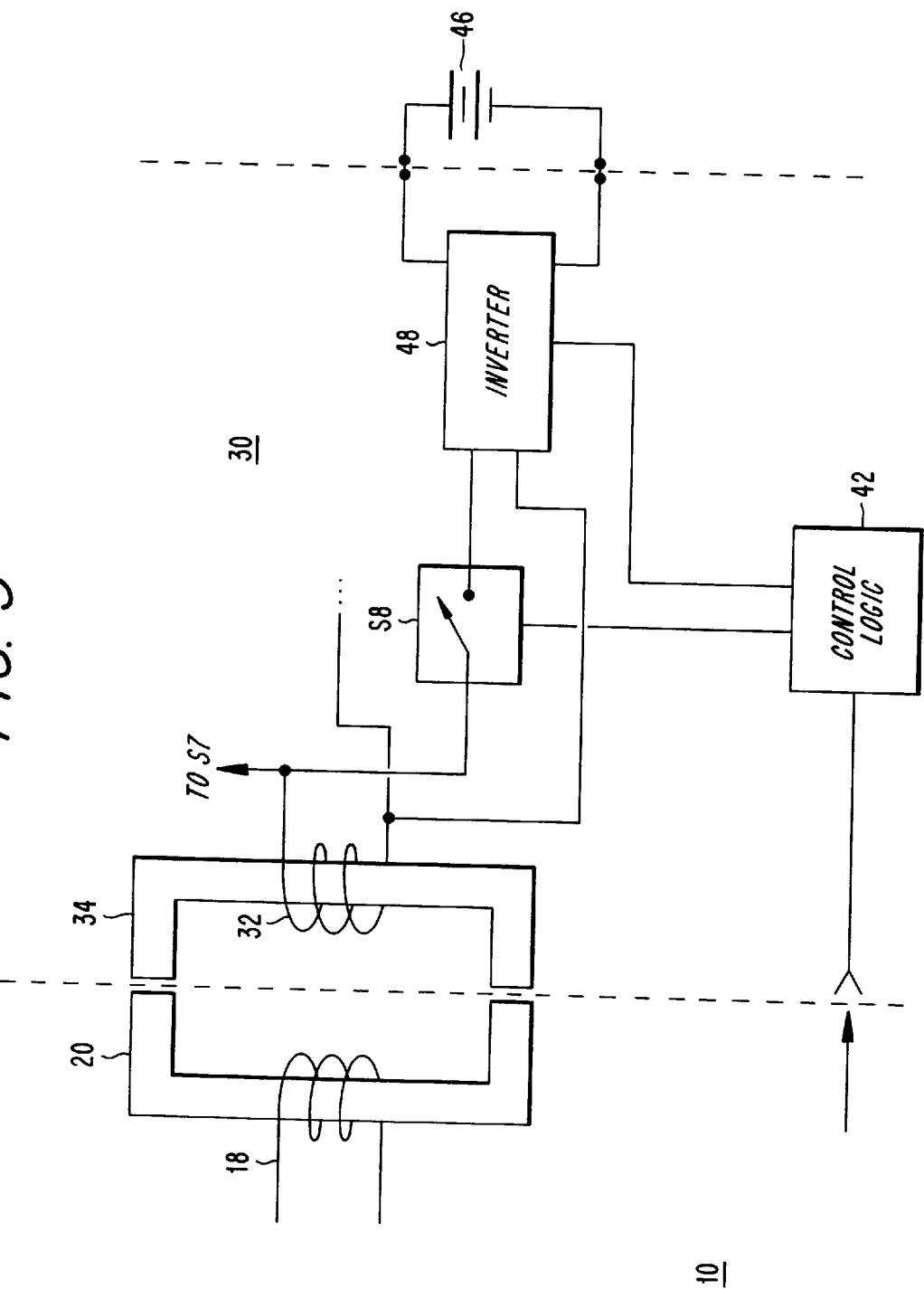
FIG. 3 is a block diagram of a second alternative embodiment of the battery assembly and portable electronic device of FIG. 1.

FIG. 3 shows a block diagram of a second alternative embodiment of the battery assembly and portable electronic device of FIG. 1. The embodiment of FIG. 3 is substantially similar to the embodiment of FIG. 2, except that the portable electronic instrument 30 is connected to receive DC power from an external DC power source 46, and device 30 further includes an inverter 48 for inverting the DC voltage supplied to it by external DC power source 46. When control logic element 42 renders switch S8 closed, in the manner described above with respect to FIG. 2, inverter 48 supplies an AC voltage to secondary winding 32 via closed switch S8. In this manner, the embodiment of FIG. 3 includes means for supplying an external DC power source to the second portion of the transformer and an inverting means in the portable electronic device 30 for inverting a DC voltage, such that the rechargeable power source 10 is recharged when the battery assembly 10 and portable electronic device 30 are connected while the device 30 receives external DC power from an external source.

As should be apparent from this description, the device and system of the present invention overcomes the deficiencies of the prior art by providing a reliable, long-life power supply for a portable electronic device requiring multiple supply voltages while enhancing the portability of the device.

While the foregoing description includes numerous details and specificities, it is to be understood that these are for purposes of explanation only. Many modifications will be readily apparent to those of ordinary skill in the art which are clearly within the spirit and scope of the invention, as defined by the following claims and their legal equivalents.

What is claimed is:

1. A power supply for a portable electronic device, comprising:

a power source which includes a DC power supply for providing a DC voltage, wherein the DC power supply includes one or more rechargeable DC batteries; and a first transformer portion having a primary transformer winding around a first core element, wherein the power supply cooperates with the portable electronic device, the portable electronic device including a second transformer portion having one or more secondary windings around a second core element, such that the first transformer portion and the second transformer portion form a complete transformer to transfer power between the power supply and the portable electronic device.

2. The power supply of claim 1, wherein the power source further includes a DC-to-AC inverter for converting the DC voltage into an AC voltage.

3. The power supply of claim 1, further comprising rectifying means for rectifying an AC voltage transferred from the portable electronic device to the power supply, and supplying the rectified AC voltage to the power source.

4. The power supply of claim 1, wherein the portable electronic device is a wireless communication device.

5. The power supply of claim 2, further comprising overcurrent protection means for protecting the DC-to-AC inverter from overcurrents.

6. The power supply of claim 5, wherein the overcurrent protection means is a fuse connected between the DC power supply and the DC-to-AC inverter.

7. The power supply of claim 5, wherein the overcurrent protection means is a circuit breaker connected between the DC power supply and the DC-to-AC inverter.

8. A power supply circuit for a portable electronic device, comprising:

a second transformer portion including a second core element and one or more secondary windings around the core element; and one or more voltage supply means, each voltage supply means associated with one of the one or more secondary windings, for providing one or more supply voltages, wherein the second transformer portion cooperates with a DC power supply including a first transformer portion having a first core element and a primary winding so as to form a complete transformer for transferring power between the DC power supply and the portable electronic devices, wherein the DC power supply includes one or more rechargeable DC batteries.

9. The circuit of claim 8, wherein the supply voltages include a plurality of DC supply voltages and at least one AC supply voltage.

10. The circuit of claim 8, further comprising means for detecting control information transmitted from the power supply to the portable electronic device.

11. The circuit of claim 10, wherein the control information includes interruptions in power transferred from the first transformer portion to the second transformer portion.

12. The circuit of claim 8, wherein the portable electronic device is a wireless communication device.

13. The circuit of claim 8, further comprising means for supplying an AC voltage provided by an AC power source external to the portable electronic device to one of the one or more secondary windings, such that a recharge voltage is transferred from the second transformer portion to the first transformer portion.

14. A power supply system, comprising:
- a power supply device including a DC power source for supplying a DC voltage, and a first transformer portion having a primary transformer winding around a first core element, wherein the DC power source includes one or more rechargeable DC batteries; and
- an electronic device including a second transformer portion having one or more secondary transformer windings around a second core element, the electronic device receiving the power supply device such that the first and second transformer portions cooperate to form a complete power supply circuit.

15. The system of claim 14, wherein the electronic device further includes means for providing a plurality of DC power supply voltages from the one or more secondary transformer windings.

16. The system of claim 15, wherein the electronic device further includes means for regulating each of the plurality of DC power supply voltages.

17. The system of claim 14, wherein the electronic device further includes means for providing at least one DC power supply voltage and at least one AC power supply voltage from the secondary transformer windings.

18. The system of claim 14, wherein the electronic device is a wireless communication device.

19. The system of claim 14, wherein the power supply device further includes a DC-to-AC inverter for converting the DC voltage into an AC voltage and providing the AC voltage to the first transformer portion.

20. The system of claim 14, wherein the power supply device further includes a rectifying means and the electronic device further includes means for coupling external AC power to one or more of the one or more secondary windings, such that the one or more rechargeable DC batteries is recharged when the power supply device and the electronic device cooperate and the electronic device receives external AC power from an external source.

21. The system of claim 14, wherein the electronic device further includes means for supplying an external voltage to one or more of the one or more secondary windings such that a recharge voltage is transferred from the second transformer portion to the first transformer portion, and the power supply device further includes a rectifying means for rectifying the recharge voltage and supplying the rectified recharge voltage to a power source in the power supply device.

* * * * *